Jan. 1, 1924. 1,479,636
J. B. WIARD
DYNAMO ELECTRIC MACHINE
Filed Sept. 15, 1919 2 Sheets-Sheet 1

Inventor:
John B. Wiard,
by Mury Booth Janney Varney Attys

Jan. 1, 1924. 1,479,636
J. B. WIARD
DYNAMO ELECTRIC MACHINE
Filed Sept. 15, 1919 2 Sheets-Sheet 2

Inventor:
John B. Wiard,
by Emery Booth Janney Varney
Attys.

Patented Jan. 1, 1924.

1,479,636

UNITED STATES PATENT OFFICE.

JOHN B. WIARD, OF LYNN, MASSACHUSETTS.

DYNAMO-ELECTRIC MACHINE.

Application filed September 15, 1919. Serial No. 323,854.

*To all whom it may concern:*

Be it known that I, JOHN B. WIARD, a citizen of the United States, and a resident of Lynn, in the county of Essex and State of Massachusetts, have invented an Improvement in Dynamo-Electric-Machines, of which the following description, in connection with the accompanying drawings, is a specification, like characters on the drawings representing like parts.

This invention relates to dynamo electric machines and more particularly to improvements in dissipating the heat arising from the internal losses in such machines and also to improvements in the framework construction and other features relating to such apparatus.

The invention is not limited to any particular type of dynamo electric machine, although as to certain features it is particularly applicable and is herein illustrated as applied to alternating current motors and especially alternating current motors of the induction type.

The invention will be best understood by reference to the following description when taken in connection with the accompanying illustration showing one specific embodiment thereof while its scope will be more particularly pointed out in the appended claims.

Figure 1:
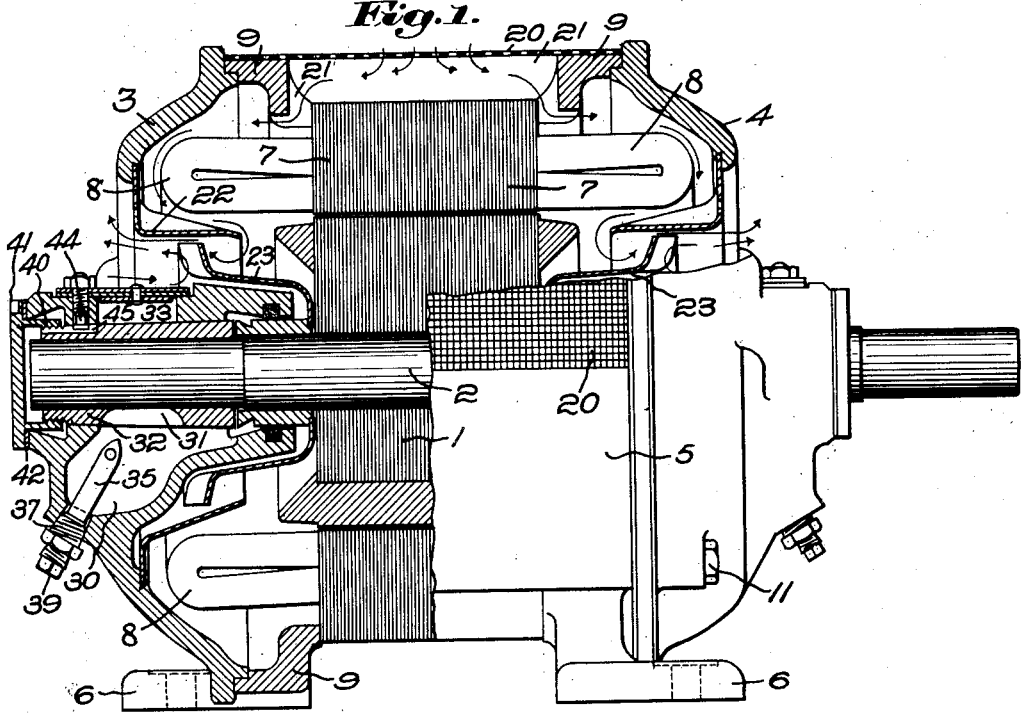
Figure 1 is a front elevation in partial longitudinal section illustrating a motor embodying one form of the invention.
Figure 2:
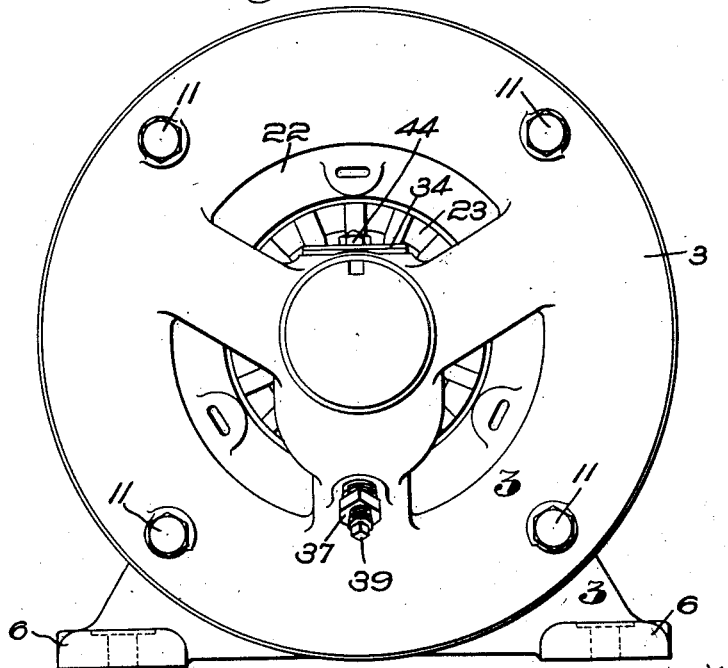
Fig. 2 is an end elevation of the motor shown in Fig. 1.

Referring to the drawings, I have there illustrated the invention by embodiment in an alternating current motor of the induction type employing the rotor 1 having the shaft 2 running in bearings which are carried by the end shields 3 and 4, the latter having secured between them the stator frame which is partially enclosed within the cylindrical casing 5. The end shields are provided with the feet 6 on which the motor rests or by means of which it may be secured to any suitable support—either floor, wall or ceiling.

The stator includes the usual laminated metallic sheets 7 with the associated windings 8, the laminations being held between end flanges 9 (one of which is shown in section in Fig. 1), and the latter in turn being held between the end shields 3 and 4.

In the construction of dynamo electric machines employing laminæ in the stator member, it has been a common practice to assemble the stator by riveting the laminæ between cast or forged flanges, such riveting being done while the structure is subjected to heavy pressure along its axis. After the pressure has been removed, the stress arising therefrom is borne by the rivet heads so that the size of the rivets and their heads determines to a considerable extent the rigidity of the structure.

Figure 3:
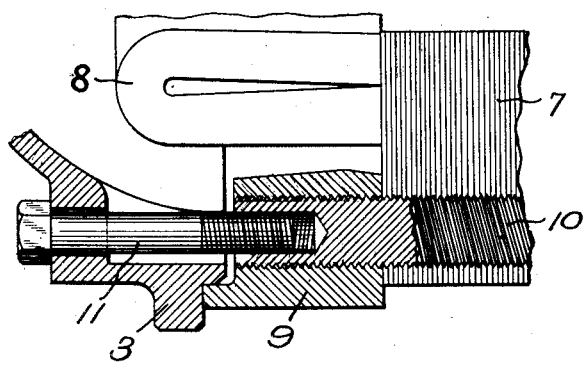
Fig. 3 is a sectional detail taken on the line 3—3 in Fig. 2 and showing the method of assembling the stator.

In the illustrated motor the laminations are held between the end flanges 9 in such manner that the stress incident to the pressure referred to is distributed throughout the depth or thickness of the core and throughout the length of the holding member, so that each lamination contributes to maintaining the structure in its compressed and assembled state. This may be accomplished in various ways but herein (Fig. 3) the laminations of the stator are held together and between the flanges 9 by means of one or more threaded studs 10 (herein four in number) which have threaded engagement with the individual laminæ and with the end flanges. These may be conveniently applied, for example, by first placing the laminations in a jig between the two flanges in such a way that their bores are correctly aligned and subjecting them to heavy pressure. The flanges and laminations may be provided with as many holes as there are studs to be employed and while the structure is thus held under pressure the holes are threaded and the threaded studs, one of which is shown in Fig. 3, are introduced. The structure is then removed from the jig.

It will thus be seen that the pressure referred to is distributed throughout the stud and is borne by the threads and the successive individual laminæ. For convenience the ends of the studs may be threaded in the manner shown so that they are suitable for the reception of cap screws 11 by means of which the end shields 3 and 4 are bolted into position.

In order to assist in dissipating the heat, cooling air is forced through the interior of the motor, such cooling air being preferably so conducted that it first comes in contact with the stator parts and is then discharged about the rotor parts and about the bearings thereof. To this end the stator is provided with one or more air inlet openings preferably covered with fine mesh screens, the mechanical construction of the stator offering opportunity for the provision of air inlet passages of ample cross sectional area. These openings may be of any desired number, size or location but in the illustrated motor there are several at each end of the stator structure, covered by a single semi-cylindrical screen 20, shown extending over the upper half of the stator flanges. The air entering the screened inlet openings is caused to divide into two parts, one part passing to one end of the motor and the other part to the opposite end. Each current of air is caused to pass through a series of ventilating ducts 21 formed in the flanges, thence passing (as shown by the direction of the arrows in Fig. 1) over and about the stator coils 8 and thence, through the interposition of the deflector shield 22, again moving inwardly. This brings it against or in proximity to the end of the rotor windings where it is expelled from the casing round about the bearing parts by means of the ventilating fan 23.

Figure 5:
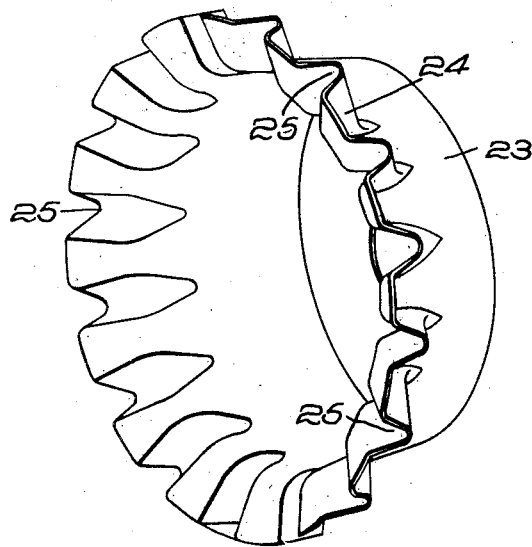
Fig. 5 is a perspective showing the shape of the ventilating fan.

As indicated in Fig. 1, a ventilating fan is secured at each end of the rotor and serves to maintain the two symmetrical currents of air in the paths described. This construction is shown in Fig. 5 from which it will be observed that the fan comprises a shell-like body with a flaring end or flange fluted so as to form what in effect are vanes or blades between which there are provided interior channels 24 and exterior channels 25. This shape of fan provides not only for the movement of an interior current of air but also for an exterior current which is set into movement by the exterior channels 25. That is to say, besides the air which is expelled from the interior of the casing there is also a current of air drawn inwardly from the end of the shaft, close to the bearings and toward the fan, whence it is deflected radially outward, as indicated in Fig. 1, joining the current of air which is expelled from the casing. This action of the fan therefore provides an external cooling current for cooling the bearings as well as the maintenance of the internal cooling current of air.

By introducing the cooling current of air through the casing 5, it is first brought into contact with the stator core and windings when at its lowest temperature and is therefore more effective for cooling these parts than if first introduced at or about the bearings and then expelled through the casing. The stator of an induction motor on which the primary winding is mounted always operates at a certain temperature rise above the surrounding air, even though the motor is delivering no power, inasmuch as practically all the exciting losses of the motor are confined to the stator. Its winding is also provided with insulation which is susceptible to breakdown from excessive temperatures, whereas the squirrel cage rotor has no insulation, thus making it especially desirable to bring the cooling air first into contact with the stator parts.

The cooling current of air in the illustrative form of motor is subdivided into two symmetrical ventilating currents which are discharged at the opposite ends of the motor so that there is assured the circulation of a current of the coolest air about each end of the stator winding and an equal reduction in the temperature rise at both ends of the motor.

The introduction of the cooling air first to the stator parts and thence to the rotor parts and bearings also possesses other advantages. By taking the air through the casing large inlet openings may be provided which can be covered by fine mesh screens of large area, and the entering air can be much more effectively screened in passing through the motor than if screens were located over the comparatively small inlets available round the bearing housings. The screens employed for the large area openings in the casing do not tend to clog so rapidly and because of the large area a given amount of air can be drawn through the screen even though it is covered by considerable accumulations of lint and dust. The screens can be readily removed even while the motor is running, if necessary, and instead of or in addition to using fine wire mesh the large area referred to permits the use of loosely woven cloth or similar material for effectively straining the incoming air. Furthermore, the air entering the large area openings in the casing enters the same at a lesser velocity than through the smaller openings round the bearing housings and is less likely to build up solid accumulations of lint and dirt upon the screens.

Where cooling air is introduced into the motor housing around the bearings, oil is sometimes slowly drained from the housings through a siphoning action or "oil creepage," and the bearing housings becoming more or less covered with lint and dust, such a siphoning action is aggravated by the capillary action of the lint. When air is taken in about the bearings, furthermore, the screens employed thereat tend to become covered with oil and thereupon become rapidly clogged through the adherence of lint and dirt to the oily surface. The incoming air also tends to draw an oil mist into the motor interior, depositing oil and dirt upon the stator windings with a resulting deterioration of the insulation and an increase of temperature rise. With the system of ventilation herein described accidental overflow of the bearings during the filling operation can have no effect so far as ventilation is concerned since all the air passing over the bearing housings is expelled from the motor instead of being drawn into it. Any oil mist or oil which may gather in large quantities due to overflow of bearings is excluded from the interior of the motor, being blown from the inside edge of the fan. This system of ventilation therefore insures the maintenance of clean motors even when installed in locations where the atmosphere is heavily laden with lint, dirt, etc., and provides for operation at a lower temperature rise and an increase in the life of the motor.

Figure 4:
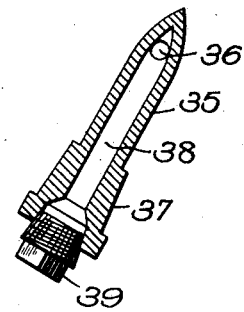
Fig. 4 is a sectional detail showing the construction of the combined oil level, indicating and draining device.

Referring now to the lubrication for the motor, the bearing housing is provided with an oil space 30 which may be filled with some suitable substance such as wool waste adapted to apply the oil by capillary attraction to the shaft 2 through one or more openings 31 in the bearing lining 32. The oil space 30 may be filled through any suitable opening, such as the filling opening 33 normally covered by the removable cap piece or cover 34. To serve as an indicator and prevent the bearing from being filled to too high a level, I have provided the overflow tube 35 (Figs. 1 and 4) provided with one or more overflow openings 36 located at approximately the upper limit of the level desired. Such tube is carried by the threaded head 37 screwed into the bearing housing and presents an overflow passage 38 communicating with the overflow holes 36 and passing through the threaded head, but normally closed by the plug 39.

When the bearing housing is filled, the plug 39 is removed. When the desired level is reached the surplus oil will run through the lateral holes 36 down through the tube and out through the opening where it may be caught in any suitable receptacle, there being no tendency for this oil to run down the side of the end shield in which the housing is carried. When no more oil emerges the plug 39 may be replaced, leaving the bearing in such condition that no dirt can enter. When it is desired to drain the bearing, the threaded head 37 carrying the overflow tube and plug is removed, thus draining the bearing at the lowest point. The plug therefore constitutes a combined overflow and drain both of which functions are taken care of at the same point and by drilling and tapping but a single hole in the bearing housing. This combined drain and overflow may be employed with other types of bearing than the one herein shown for indicating the level and providing the overflow and drain functions referred to.

The lining 32, it will be observed, is mounted in its housing by means of a taper fit, being held in position by a nut 40 having threaded engagement with the small end of the lining and having the exterior head 41. The head of the nut bears against a spring washer 42 so that the tapered lining can be easily drawn down to its tapered seat in the housing and maintained tight therein. This avoids any looseness which is sometimes encountered in bearing linings where there is an initial looseness becoming aggravated in continued use through a pounding and wearing action. In order to insure the linings being assembled in but one position, the threaded stud 44 which fastens the cover 34 for the filling opening is extended and forms a pin or key which fits into a slot 45 in the outside surface of the lining at one end.

While I have herein shown and described for purposes of illustration one specific embodiment of the invention, it is to be understood that the same is not limited to the specific form herein shown or the particular application herein made thereof or to the details of mechanical construction herein described but that extensive deviations may be made therefrom without departing from the spirit of the invention.

Claims:

1. A dynamo electric machine having a rotor, a stator, a casing and end shields, an air admission opening in the casing, an air discharge passage in an end shield, a ventilating device adapted to force a current of air into said casing and out through said end shield, air ducts causing said air to pass about the stator parts, a deflecting surface presented by said end shield to deflect the air away from said end shield and inwardly toward said ventilating device.

2. A dynamo electric machine having a rotor, a stator, air cooling passages including a discharge passage extending through the end of the machine, an air circulating fan within the working space of the machine for discharging air through said passage, a journal bearing for the rotor in proximity to said air circulating fan, and a deflecting shield surrounding the working portion of the fan.

3. A dynamo electric machine having a casing, bearings, and an air ventilating device adapted to discharge a cooling current of air from the casing and simultaneously to create a separate cooling current of air over and about the bearings.

4. A dynamo electric machine having a rotor, a stator, air cooling passages including a discharge passage extending through the end of the machine, a journal bearing for the rotor near said discharge passage, and an air circulating device for forcing air through said passages and for forcing a separate current of air over said bearings through a path external to the machine.

In testimony whereof, I have signed my name to this specification.

JOHN B. WIARD.